United States Patent Office 3,287,106
Patented Nov. 22, 1966

3,287,106
METHOD FOR INHIBITING THE GROWTH OF GRASS TYPE WEEDS
John P. Chupp, Kirkwood, Mo., assignor to Monsanto Company, a corporation of Delaware
No Drawing. Filed Nov. 15, 1963, Ser. No. 323,915
9 Claims. (Cl. 71—2.7)

This invention relates to new herbicidal compositions and to novel methods for using them in the control of unwanted vegetation. More specifically, the invention relates to substituted acetamides and their use in inhibiting the normal growth of grasses. Effective destruction of the weeds takes place at very low levels of application.

In recent years the α-chloroacetamide herbicides have been discovered and found to have unusual activities in the elimination of grasses from soil where other desirable crops are growing. This selective activity operates preemergently in destroying the plants at the time of emergence or before emergence from the soil.

The prior art acetamide herbicides are the α-chloroacetamides with one or two organic radicals substituted on the nitrogen atoms. The compounds are prepared by reacting a primary or secondary amine of the desired configuration with α-chloroacetyl chloride. This procedure cannot be used in the preparation of α-chloroacetamide herbicides with alkoxymethyl substituents on the nitrogen atom.

In accordance with this invention it has been found that N-aliphatic-α-chloroacetamides containing an additional alkoxymethyl substituent on the nitrogen atom are superior herbicides and can be prepared by a convenient and efficient procedure.

The compounds which have the desirable characteristics are those of the structure:

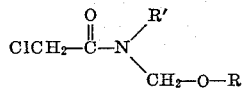

wherein R is selected from the class consisting of alkyl having up to 12 carbon atoms, alkenyl having up to 12 carbon atoms and alkynyl having up to 12 carbon atoms; and wherein R' is selected from the class consisting of alkyl having from one to four carbon atoms, alkenyl having from two to four carbon atoms and alkynyl having from three to four carbon atoms.

The above novel compounds for use in the practice of this invention are separately disclosed and claimed in applications Serial No. 323,912, filed November 15, 1963, and Serial No. 323,925, filed November 15, 1963, by John P. Chupp. These cases also disclose and claim different methods by which the novel compounds can be prepared.

The relative value of the aliphatic substituted alkoxy α-chloroacetamides was determined by planting in greenhouse flats seeds of different plants each representing a principal botanical type. The flats were treated with the herbicides at the rate equivalent to 5 pounds, 1 pound and ¼ pound per acre. In the following tables of herbicidal evaluation data, these plants are represented by letters as follows:

A  Wild oat            I  Cotton
B  Brome               J  Corn
C  Rye grass           K  Soybean
D  Foxtail             L  Wild buckwheat
E  Barnyard grass      M  Tomato
F  Crab grass          N  Sorghum
G  Pigweed             O  Rice
H  Sugar beet The relative value of each compound with respect to its herbicidal effect on the various plants is indicated by a number as follows:

0  No phytotoxicity
1  Slight phytotoxocity
2  Moderate phytotoxicity
3  Severe phytotoxicity

| | Lbs. Per acre | A | B | C | D | E | F | G | H | I | J | K | L | M | N | O |
|---|---|---|---|---|---|---|---|---|---|---|---|---|---|---|---|---|
| N-methyl-N-n-butyloxymethyl-α-chloroacetamide | 5 | 2 | 3 | 3 | 3 |   | 3 | 3 | 1 |   |   | 2 | 0 | 2 | 2 |   |
| | 1 | 2 | 3 | 3 | 3 | 3 | 3 | 3 | 1 | 0 | 0 | 0 | 0 | 0 | 3 | 2 |
| | ¼ | 0 | 0 | 2 | 2 | 2 | 3 | 2 | 2 | 0 | 0 | 0 | 0 | 0 | 1 | 0 |
| N-(n-propyl)-N-(n-butyloxymethyl)α-chloracetamide | 5 | 3 | 3 | 3 | 3 |   | 3 | 3 | 0 |   |   | 0 | 1 | 0 | 3 |   |
| | 1 | 0 | 3 | 3 | 2 | 3 | 3 | 2 | 0 | 0 | 0 | 0 | 2 | 0 | 1 | 2 |

Other compounds having desirable herbicidal properties are:

N-methyl-N-allyloxymethyl-α-chloroacetamide
N-allyl-N-methoxymethyl-α-chloroacetamide
N-butyl-N-lauryloxymethyl-α-chloroacetamide
N-ethyl-N-decenyloxymethyl-α-chloroacetamide
N-propargyl-N-propyloxymethyl-α-chloroacetamide
N-methyl-N-propargyloxymethyl-α-chloroacetamide
N-methyl-N-octynyloxymethyl-α-chloroacetamide
N-butyl-N-dodecyloxymethyl-α-chloroacetamide
N-isopropyl-N-butyloxymethyl-α-chloroacetamide
N-n-propyl-N-isobutenyloxymethyl-α-chloroacetamide
N-(2-ethylhexyl)-N-ethoxymethyl-α-chloroacetamide From the foregoing table of evaluation data it will be apparent that the α-chloroacetamides having aliphatic oxymethyl substituents are very effective grass-specific herbicides at five and one pounds per acre application levels. It will be noticed that the crop plants, soybean, corn, cotton, and sugar beet are not inhibited by the herbicides, which is severly phytotoxic to all of the grasses, for example wild oat, brome grass, rye grass, foxtail, barnyard grass and crab grass.

The herbicides are used preemergently by uniform surface application or by light cultivation so as to disperse the surface applied herbicides into the top layer of soil. The seed before or the seedling at the time of germination contacts the herbicides, which produce the inhibitory effect, usually before the plant emerges from the ground. In some cases the seriously inhibited seedling will emerge slightly before the herbicidal activity is noticed. In such cases the plant will be destroyed soon after emergence.

Although the above described data show superior effects at 5 and 1 pounds per acre application levels, many of the herbicides are active at lower levels, for example ¼ pound per acre. For example, the above table shows that N-(n-butyloxymethyl)-α-chloroacetamide when used at ¼ pound per acre will have inhibitory effects on several types of grasses but has no herbicidal effect on corn, cotton, sugar beet and soybean. At high levels of application, for example at 5 to 10 pounds per acre, a broader spectrum of weed activity will be noticed and even at these higher levels the crop plants are not affected. Some sensitive plants are destroyed preemergently at levels as low as 0.1 pound per acre. It appears that the activity is to some extent restricted to monocotyledonous plants. However, occasionally even the dicotyledonous plants are destroyed.

The solid formulations, frequently referred to as "dusts" may contain in addition to the active ingredient, diluents or extenders, dispersing agents to prevent local high concentrations, and agents to facilitate distribution in soil or soil waters. Suitable solid diluents are those which render the compositions permanently dry and free flowing. Thus, hygroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as acid washed bentonite, precipitated calcium phosphate, precipitated calcium carbonate and colloidal silica. These diluents may represent a substantial portion, for example 50 to 98 percent by weight of the entire formulation as applied to plant or soil. More concentrated herbicides will require dilution by the user in order to properly condition the soil for the most effective usage. The concentrated solid herbicidal formulations can be used with less danger if they are mixed with the surface soil by means of a disk-plow or harrow at the time of application.

The liquid compositions for herbicidal use may be solutions, or other liquid dispersions. The choice of a liquid medium will depend to some extent upon the physical properties of the active ingredient. The N-substituted α-haloacetamides may be water-soluble and mere dissolution will then provide a usable formulation. Often the N-substituted α-chloroacetamides are only limitedly soluble in water and therefore aqueous formulations will necessarily be dispersions of minute drops of the water-insoluble substances in suspension in an aqueous medium. The known water-insoluble substituted α-haloacetamides of this invention may first be dissolved in a suitable organic solvent and the organic solution of the active ingredient then incorporated in water or in any aqueous medium to produce a heterogeneous dispersion of the active ingredient in water.

One composition which aids in the effectivity of the herbicidal component is a surface active agent which serves in providing uniform dispersions of all formulation components of both solid and liquid types, and may be anionic, cationic, or non-ionic types and includes conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as one percent or as much as twenty percent in order to provide a uniformly distributed formulation which is capable of maintaining its distributed state during storage, use and after application to the soil or plant surfaces.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil or plant surfaces being treated. For this purpose readily flowable compositions are required, either in liquid or solid physical state. Thus, a critical aspect of the invention is the fluent carrier without which the optimum herbicidal effects cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed destroying properties. The described conditioning agents enable the proper use to achieve the desired herbicidal effects by an unskilled operator without elaborate equipment.

Although the invention is described with respect to specific examples and modifications, it is not intended that the details thereof are limitations on the scope of the invention except to the extent incorporated in the following claims.

The embodiments of the invention in which an exclusive property or privilege is claimed are defined as follows:

1. The method of inhibiting the growth of grass type weeds in contact with agricultural soils which comprises applying to the soil a herbicidal amount of a compound of the structure:

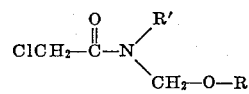

wherein R is selected from the class consisting of alkyl having up to 12 carbon atoms, alkenyl having up to 12 carbon atoms and alkynyl having up to 12 carbon atoms; and wherein R' is selected from the class consisting of alkyl having from one to four carbon atoms, alkenyl having from two to four carbon atoms and alkynyl having from three to four carbon atoms.

2. The method of inhibiting the growth of grass type weeds in contact with agricultural soils which comprises applying to the soil a herbicidal amount of N-alkyl-N-alkoxy-methyl-α-chloroacetamide wherein the alkyl radical has up to four carbon atoms and wherein the alkoxy radical has up to 12 carbon atoms.

3. The method of inhibiting the growth of grass type weeds in contact with agricultural soils which comprises applying to the soil a herbicidal amount of N-allyl-N-alkenyl-oxymethyl-α-chloroacetamide wherein the alkenyl group has up to 12 carbon atoms.

4. The method of inhibiting the growth of grass type weeds in contact with agricultural soils which comprises applying to the soil a herbicidal amount of alkynyloxy-methyl-α-chloroacetamide wherein the alkynyl radical has up to 12 carbon atoms.

5. The method of inhibiting the growth of grass type weeds in contact with agricultural soils which comprises applying to the soil from 0.1 to 10 pounds per acre of N-methyl-N-n-butyloxymethyl-α-chloroacetamide.

6. The method of inhibiting the growth of grass type weeds in contact with agricultural soils which comprises applying to the soil from 0.1 to 10 pounds per acre of N-(n-propyl)-N-(n-butyloxymethyl)-α-chloroacetamide.

7. The method of inhibiting the growth of grass type weeds in contact with agricultural soils which comprises applying to the soil from 0.1 to 10 pounds per acre of N-allyl-N-ethyloxymethyl-α-chloroacetamide.

8. The method of inhibiting the growth of grass type weeds in contact with agricultural soils which comprises applying to the soil from 0.1 to 10 pounds per acre of N-ethyl-N-dodecyloxymethyl-α-chloroacetamide.

9. The method of inhibiting the growth of grass type weeds in contact with agricultural soils which comprises applying to the soil from 0.1 to 10 pounds per acre of N-propargyl-N-2-ethylhexoxymethyl-α-chloroacetamide.

References Cited by the Examiner

UNITED STATES PATENTS

| 2,864,683 | 12/1958 | Hamm et al. | 71—2.7 |
| 3,133,808 | 5/1962 | Hamm | 71—2.7 |

FOREIGN PATENTS

| 1,237,359 | 6/1966 | France. |

LEWIS GOTTS, *Primary Examiner.*

JAMES O. THOMAS, JR., *Examiner.*

A. J. ADAMCIK, *Assistant Examiner.*